United States Patent [19]

Fushiya et al.

[11] Patent Number: 4,504,769
[45] Date of Patent: Mar. 12, 1985

[54] ELECTRICALLY-POWERED TOOL

[75] Inventors: Fusao Fushiya; Takao Iwatuki, both of Anjo, Japan

[73] Assignee: Makita Electric Works, Ltd., Aichi, Japan

[21] Appl. No.: 314,419

[22] Filed: Oct. 23, 1981

[30] Foreign Application Priority Data

Oct. 28, 1980 [JP] Japan .................. 55-151689
Dec. 29, 1980 [JP] Japan .................. 55-189385[U]

[51] Int. Cl.$^3$ ............................................. H02P 5/12
[52] U.S. Cl. ............................. 318/345 H; 310/95; 318/325; 318/326; 361/51
[58] Field of Search ............ 361/51; 165/80 R, 80 A, 165/80 B, 80 D, 58, 59; 310/64, 95, 76, 77, 93; 29/592 R, 602 R; 188/180; 318/434, 345 H, 345 G, 345 D, 345 C, 314, 311, 325, 326, 372, 314, 304, 400

[56] References Cited

U.S. PATENT DOCUMENTS

| | | | |
|---|---|---|---|
| 1,900,589 | 3/1933 | Seeley | 361/51 |
| 2,416,122 | 2/1947 | Shaffer | 188/180 |
| 2,794,163 | 5/1957 | Hall et al. | 361/51 X |
| 3,250,929 | 5/1966 | Maier | 310/64 X |
| 3,523,234 | 8/1970 | Turtle | 318/345 D X |
| 3,538,412 | 11/1970 | Graf et al. | 318/345 C |
| 3,564,372 | 2/1971 | Vogelsberg et al. | 361/23 X |
| 3,584,248 | 6/1971 | Higashino et al. | 310/64 X |
| 3,950,626 | 4/1976 | Greenhut | 318/325 X |
| 4,317,176 | 2/1982 | Saar et al. | 318/434 X |

FOREIGN PATENT DOCUMENTS 1950385  4/1971  Fed. Rep. of Germany ........ 310/64

Primary Examiner—Ulysses Weldon
Attorney, Agent, or Firm—Dennison, Meserole, Pollack & Scheiner

[57] ABSTRACT

In an electrically-powered tool, the driving motor of the tool and a switching element for a phase control circuit for controlling the number of revolutions of the motor are connected in series. The switching element is fixed to a field core of the motor. In the phase control circuit for the switching element, a bias resistance between the base and the emitter of a pulse phase controlling transistor for changing the amplification degree by the output from a pulse generating circuit for generating pulses having frequencies corresponding to the numbers of revolutions of said motor is connected in parallel with a capacitor for effectively slowly starting said motor, a first amplifier for changing the output in response to the number of revolutions of said motor and for stabilizing the rotation of said motor, and a second amplifier for producing output upon falling of the number of revolutions of said motor below the preset number of revolution and for limiting overload current. A governor like brake shoe is fixed to an armature shaft of the driving motor in the electrically-powered tool. A ring is mounted to the fixed portion of the motor, being contacted with the brake shoe deformed in the direction of centrifugal force caused by the high-speed rotation of the armature shaft under no load condition of the motor, and adapted to apply a brake force to the armature shaft.

2 Claims, 13 Drawing Figures

ELECTRICALLY-POWERED TOOL

BACKGROUND OF THE INVENTION

1. Field of the Invention

This invention relates to a motor-powered tool in which the number of revolutions of the motor is controlled by a switching element such as a thyristor and triac.

2. Description of the Prior Art

FIG. 1 shows a disc grinder 7 as an example of a conventional electrically-powered tool, which comprises a motor housing 1 disposed generally in the mid portion of the disc grinder 7, a gear box 2 connected to the fore-end portion of the motor housing 1, an abrasive wheel 3 rotatably attached to the gear box 2, and a handle 4 attached to the rear-end portion of the motor housing 1. A main switch 5 and a circuit block 6 are incorporated in the handle 4. A motor is shown generally at 8 in the motor housing 1, having an armature shaft 9 and a magnetic ring 11 connected to the armature shaft 9 through a cylindrical body 10. A switching element 12 is provided in the circuit block 6, being electrically controlled by the motor 8 revolution detecting signals produced by the magnetic ring 11 and a magnetism-sensitive element (not shown). The problem associated with this switching element 12 is that its capacitance is so large as to require a fairly large space for cooling itself. Because of this extra space, the external configuration of the circuit block 6 including such a switching element 12 is apt to be large. The longitudinal length of the disc grinder 7, as indicated by L in FIG. 1, is often 50 to 60 mm relative to an outside diameter 100 mm, for example, of the motor housing 1. Because of this problem the conventional disc grinder 7 has the following disadvantages:

(1) The overall tool configuration is very large and long, thus rendering an extremely poor serviceability especially in a narrow place.

(2) Large-capacity radiator fins 13 and a large-size housing 14 for covering the fins 13 must be employed to cope with increased heat generation while overload is present. Thus, the tool is awkward to operate because of the increased tool weight, giving undue fatigue to the operator.

(3) The tool uses extremely expensive, large-capacity radiator fins 13 and a large fin housing 14 for which the mold is also expensive. Thus, the overall production cost of such tools are remarkably increased.

(4) A large amount of heat will be produced when a tool is operated under an overload. For this particular reason, it is necessary to cool the motor with a large amount of air. To prevent a local heat generation, the prior art has proposed the use of radiator fins provided at the cooling air intake. The radiator fins have a number of folds and a large air-frictional resistance, adversely leading to reduced amount of air and subsequently possible motor burning during overload is being applied.

SUMMARY OF THE INVENTION

An object of the present invention is to provide a novel, electrically-powered tool which eliminates many disadvantages associated with the prior art.

Another object is to provide an electrically-powered tool which is compact, lightweight, simple in its circuit configuration, and has a superb performance characteristics.

A further object of the present invention to provide an electrically-powered tool which prevents possible motor burning and has high cooling effect on the switching element, thereby effectively preventing a thermal failure of the switching element itself.

A still further object of the present invention is to provide an electrically-powered tool which prevents excessive reaction at start-up, stabilizes motor revolutions irrespective of load variations, and positively prevents motor burning by suppressing the load current during overload operation.

A still another object of the present invention is to provide an electrically-powered tool which may readily prevent a violent rotation of the armature under no load condition.

According to the present invention, a switching element for a phase control circuit connected in series with a driving motor in an electrically-powered tool and adapted for controlling the number of revolutions of the motor, is thermally fixed to a field core of the motor.

In the phase control circuit for the switching element connected in series with the driving motor and adapted for controlling the number of revolutions of the motor, a bias resistance between the base and the emitter of a pulse phase controlling transistor for changing the amplification degree by the output from a pulse generating circuit for generating pulses having frequencies corresponding to the numbers of revolutions of the motor, is connected in parallel with a capacitor for effectively slowly starting the motor, a first amplifier for changing the output in response to the number of revolutions of the motor and for stabilizing the rotation of the motor, and a second amplifier adapted for limiting overload current and producing output voltage upon falling of the number of revolutions of the motor below the preset number of revolutions.

A governor-like brake shoe is fixed to an armature shaft of the driving motor in the electrically-powered tool. A ring is mounted to the fixed portion of the motor, being contacted with the brake shoe deformed in the direction of the centrifugal force caused by the high-speed rotation of the armature shaft under no load condition of the motor and adapted to apply a brake force to the armature shaft.

In an alternate embodiment of the present invention, the electrically-powered tool is provided with a safety device having a main switch, a driving motor for the tool, a switching element for the phase control circuit, a switch portion such as, for example, a first and a second safety switch operated by a push plate 29, so as to stop and retain the motor by releasing the power supply main circuit in the event of the motor developing unusual revolutions, all of these elements being connected in series with each other.

Various general and specific objects, advantages and aspects of the invention will become apparent when reference is made to the following detailed description considered in conjunction with the accompanying drawings.

DETAILED DESCRIPTION OF THE PREFERRED EMBODIMENTS

Figure 1:
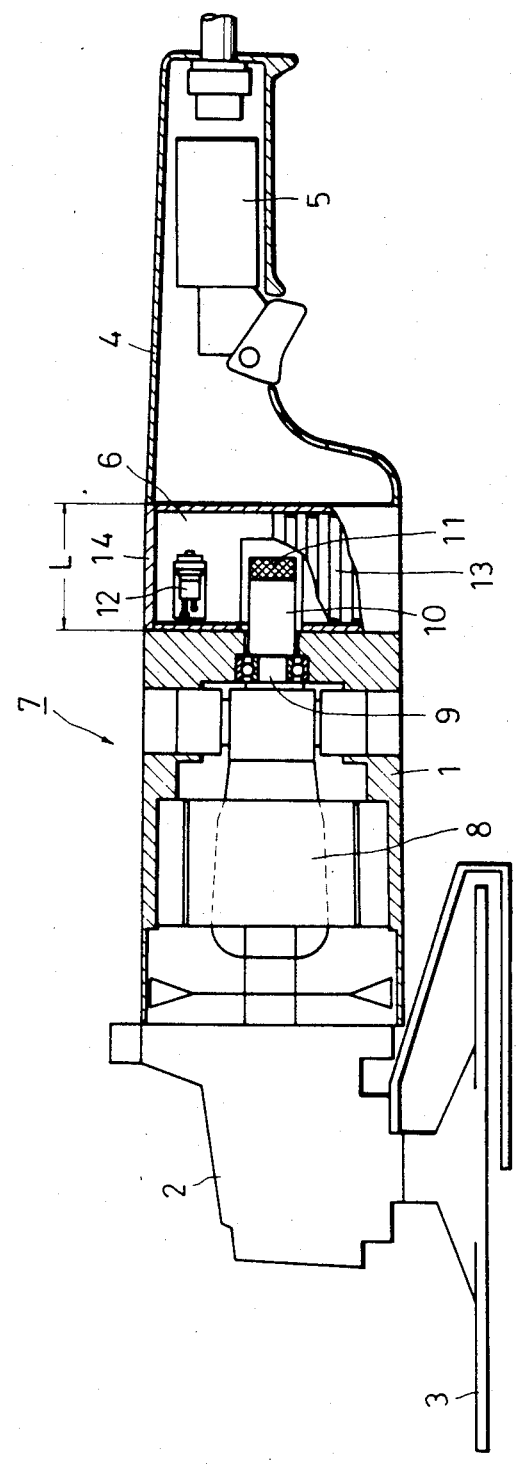
FIG. 1 is a front view in section of an electrically-powered tool according to the prior art.
Figure 2:
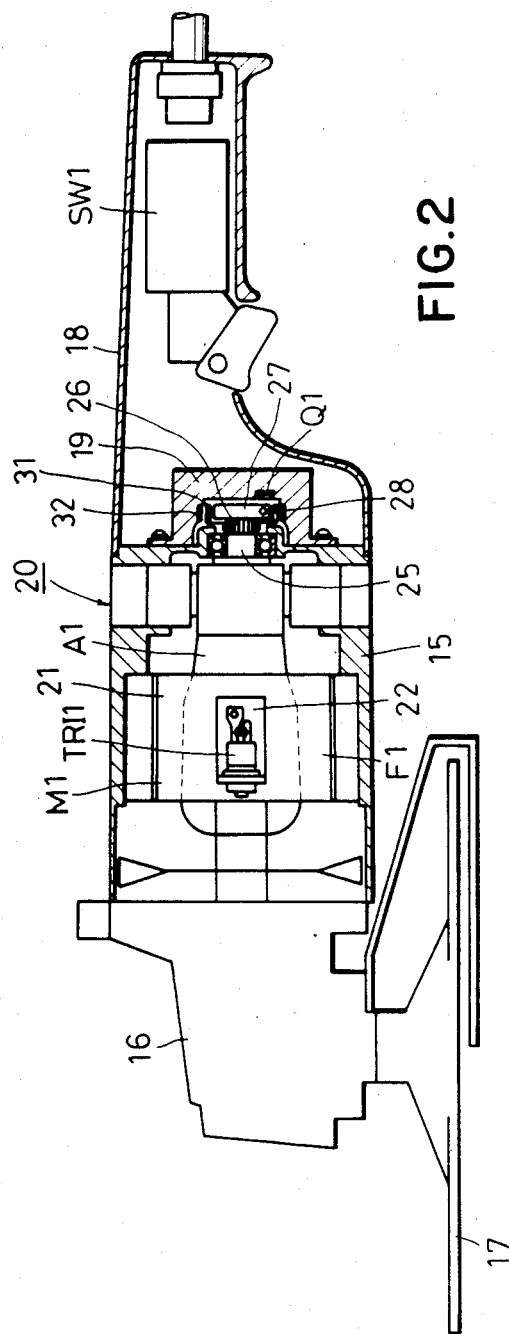
FIG. 2 is a front view in section of an electrically-powered tool according to one embodiment of the present invention.
Figure 3:
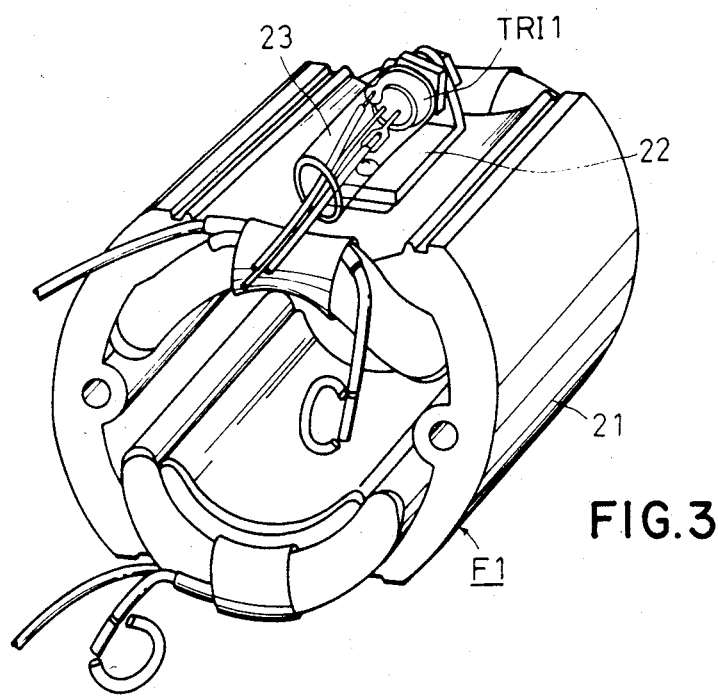
FIGS. 3 and 4 are perspective views of the field core portion of the tool in FIG. 2.
Figure 4:
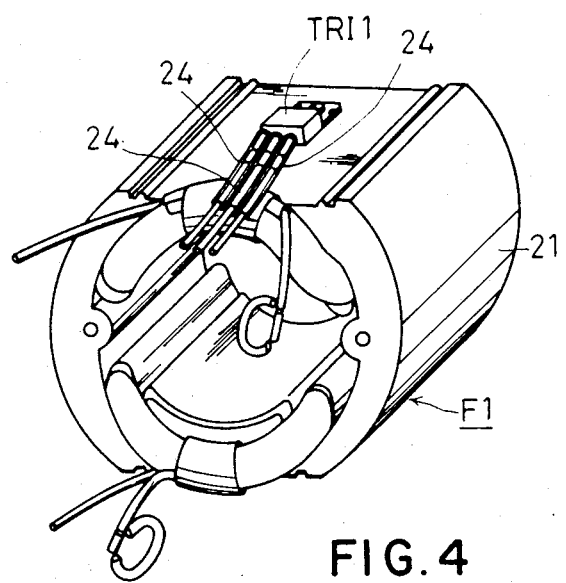

Referring now to FIG. 2, there is illustrated a disc grinder 20 consisting of a motor housing 15, an abrasive wheel 17 rotatably fixed to the motor housing 15 at the left end portion thereof through a gear box 16 as viewed in the drawing, and a handle 18 provided at the right-hand portion of the motor housing 15 as viewed in the drawing, in which are incorporated a main switch SW1 and a control circuit block 19 molded of a resin. As shown in FIGS. 3 and 4, a switching element such as an insulating-type triac TRI1 is fixed through a fixture 22 to a core 21 of a field F1 in a motor M1 (See FIG. 3), or it is directly fixed to the core 21 (See FIG. 4). Transparent insulating vinyl tubes 23 and 24 are bonded by using adhesive to the connection terminals of the triac TRI1.

Figure 6:
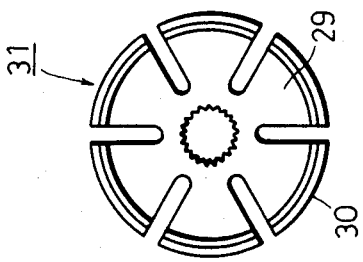
FIG. 6 is a right-hand side elevational view of the brake shoe in FIG. 5.
Figure 5:
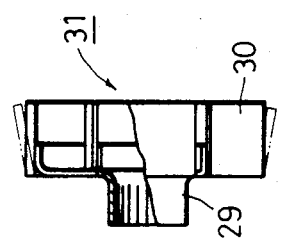
FIG. 5 is a front view partly in section of the brake shoe of the tool in FIG. 2.

A plastic-molded rotary ring 27 is mounted through a serration 26 to one end of an armature shaft 25 of the motor M1. A magnet 28 for detecting the number of revolutions of the motor M1 is embedded in the rotary ring 27 and disposed in opposed relationship with a magnetism-sensitive element Q1 embeded in the control circuit block 19. A brake shoe 31 is also mounted through the serration 26 to the same one end of the armature shaft 25 along with the rotary ring 27. As shown in FIGS. 5 and 6, the governor-like brake shoe 31 is formed by spot welding of a mild steel thick ring 30 to a spring sheet steel elastic plate 29 and by dividing the weld into six parts to permit deformation as depicted by a phantom line in FIG. 5. With this arrangement, when the motor M1 rotates with no load, the brake shoe 31 is deformed elastically by a centrifugal force caused by the rotation as depicted by a phantom line in FIG. 5 and the outermost end of the brake shoe 31 is slidably connected to the inner periphery of a copper ring 32 embedded in the inner peripheral portion of the control circuit block 19, thereby developing a brake force to be applied to an armature A1 of the Motor M1.

Figure 7:
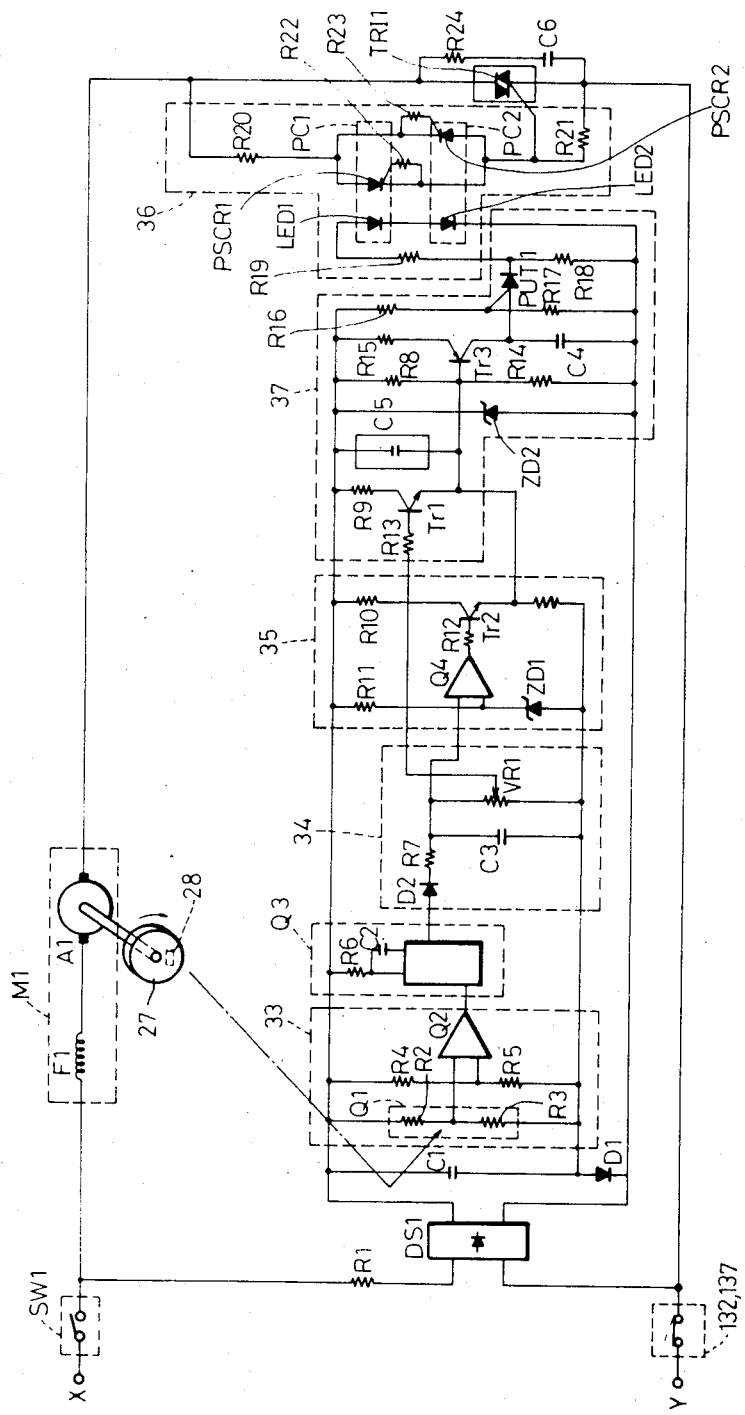
FIG. 7 is a schematic diagram of the electrical circuit of the tool according to the present invention.

Referring to FIG. 7 showing an electrical circuit of the preferred embodiment, a full-wave rectifier element DS1 is connected through the main switch SW1 and resistance R1 to terminals X and Y of AC power supply. The output from the fullwave rectifier element DS1 is smoothed through a reverse current preventing diode D1 by a capacitor C1, across which a revolution detecting circuit 33, smoothing circuit 34, and overload current limiting circuit 35 are connected. A magnetism-sensitive element Q1 is comprised of magnetism-sensitive resistances R2 and R3 which are sensitive to the magnet 28 mounted in the rotary ring 27 of the motor M1 connected through the main switch SW1 and the triac TRI1 to AC power supply. The revolution detecting circuit 33 is comprised of the magnetism-sensitive element Q1, reference voltage setting resistances R4 and R5, and comparator Q2 of an operational amplifier. The monostable multivibrator Q3 is comprised of resistance R6 and capacitor C2 wherein the pulse width is set. The smoothing circuit 34 is comprised of diode D2, resistance R7, capacitor C3 and variable resistance VR1 wherein output from the monostable multivibrator Q3 is smoothed by the diode D2, resistance R7 and capacitor C3 and the base potential of transistor Tr1 is controlled by the variable resistance VR1. The overload current limiting circuit 35 is comprised of Zener diode ZD1, comparator Q4, transistor Tr2 and resistances R10, R11, R12, R12A wherein output from the smoothing circuit 34 and voltage of the Zener diode ZD1 are compared by the comparator Q4 of an operational amplifier, so as to control the base potential of the transistor Tr2.

Across the output terminals of the full-wave rectifier element DS1, there is connected a phase control reference pulse generating circuit 37 which is comprised of a trapezoidal wave form generating Zener diode ZD2, transistors Tr1, Tr3, programable unijunction transistor PUT1, capacitors C4, C5 and resistances R8, R9, R13, R14, R15, R16, R17, R18. A trigger circuit 36 is comprised of photo couplers PC1, PC2 and resistances R19, R20, R21, R22, R23. Light emitting diodes LED1 and LED 2 which are encircled in the photo couplers PC1 and PC2, respectively, and current limiting resistance R19, are connected in series between the output terminal of PUT1 and the negative terminal of DS1. Resistance R24 and capacitor C6 are also connected in series across Triac TRI1. The phase controlling reference pulse generating circuit 37 is effective to control the transistor PUT1 and the light emitting diodes LED1 and LED2.

In operation, when the main switch SW1 is on, the potential of the capacitor C5 is zero and the transistor Tr3 is off. At this moment, the output is not supplied from the PUT1 and the triac TRI1 is not triggered. As the capacitor C5 is charged and the potential goes high, the on resistance of the transistor Tr3 decreases and the charge period of the capacitor C4 becomes short. As a result, the on phase angle of the triac TRI1 due to the trigger pulse through the PUT1 progressively increases, and the motor M1 of the disc grinder 20 starts up with the number of revolutions being progressively raised. Accordingly, at starting of the motor M1, the operator of the disc grinder suffers no reaction from the motor M1, thus ensuring the operator's safety. This slow build up of speed is called soft starting.

When the motor M1 rotates, output from the comparator Q2 of the revolution detecting circuit 33 is generated every time the armature A1 completes one revolution, and pulse having a constant width is outputted from the monostable multivibrator Q3 every time the armature A1 makes a turn. As a result, the voltage corresponding to the number of revolutions of the motor M1 is generated from the capacitor C3 of the smoothing circuit 34, and in the event that the number of revolutions of the motor M1 exceeds a specific number of revolution preset by the variable resistance VR1, the potential of the capacitor C3 increases and the on resistance of the transistor Tr1 decreases, thereby causing the on phase angle of the triac TRI1 through PUT1 to become smaller and the number of revolutions of the motor M1 to decrease. On the other hand, in the event that the number of revolutions of the motor M1 becomes smaller than the specific number of revolutions, the potential of the capacitor C3 decreases and the on resistance of the transistor Tr1 increases, thereby causing the on phase angle of the triac TRI1 through PUT1 to become larger and the number of revolutions of the motor M1 to increase. Consequently, the number of revolutions of the motor M1 can be maintained at a constant level irrespective of changes in load. In this condition, when overload is applied to the abrasive wheel and the number of revolutions of the motor M1 becomes smaller than the preset overload revolution in response to this overload, the voltage of the Zener diode ZD1 goes higher than that of the capacitor C3 in the smoothing circuit 34 and the transistor Tr2 turns on, thereby causing the on resistance of the transistor Tr3 to increase because of the decrease in the bias resistance and subsequently the charge period of the capacitor C4 in the phase controlling reference pulse generating circuit 37 to become long. As a result, the on time angle of the triac becomes smaller and the overload current is maintained at a lower level under the overload condition, so that the burning of the motor M1 may be prevented.

As should be apparent from the foregoing, the disc grinder 20 is operated with stable performance characteristics in such a manner that the motor M1 slowly starts up and stably rotates and overload current is eliminated. Furthermore, without expanding the size of the electrically-powered tool, the operational capacity of the tool can be increased and particularly, even during supply voltage drop, a sufficient operational capacity can be maintained. When the design voltage of the motor M1 is set to 75 V with respect to 100 V of the supply voltage, the operational capacity of the electrically-powered tool becomes high because of the increase in overload current and the triac TRI1 turns on at a full phase angle beyond any trigger control in a case of failure of the switching element such as a triac TRI1. Especially, under the on condition at a full phase angle, when the motor M1 rotates with no load, the number of revolutions of the motor M1 remarkably exceeds the aforementioned specific revolution, and as a result, because of the increase in the centrifugal force, the brake shoe 31 fixed to the armature shaft 25 outwardly moves from the solid line to the phantom line as shown in FIG. 5, and the outer edge portion of the brake shoe 31 rotates in contact with the copper ring 32 embedded in the control circuit block 19, so that a brake force is applied to the armature A1 and a violent rotation of the motor can be avoided. Even if the brake shoe 31 seizes to the copper ring 32, replacements of the brake shoe and the copper ring which are inexpensive may be readily effected and the disc grinder 20 can be brought to its original condition.

Figure 8:
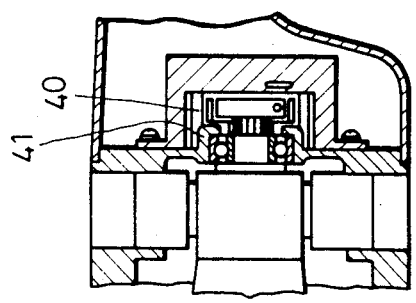
FIG. 8 is a front view of the copper ring according to the alternate embodiment of the present invention.

The transistors Tr1, Tr2 and Tr3 in the present embodiment may be substituted by an operational amplifier, and the brake shoe 31 may be altered to an arbitrary shape so as to have a governor function. Furthermore, the copper ring 40 which can abut against the brake shoe 31 may be fixed to a bearing housing 41 as shown in FIG. 8.

Figure 9:
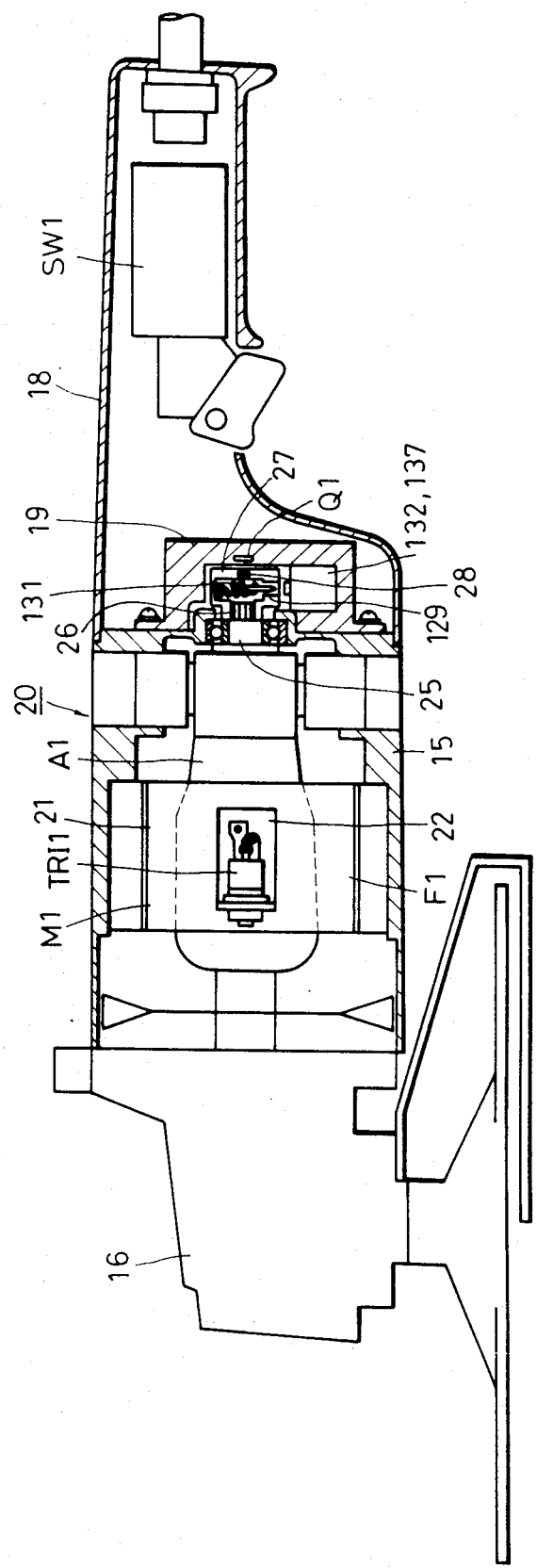
FIG. 9 is a front view in section of an electrically-powered tool according to the alternate embodiment of the present invention.
Figure 10A:
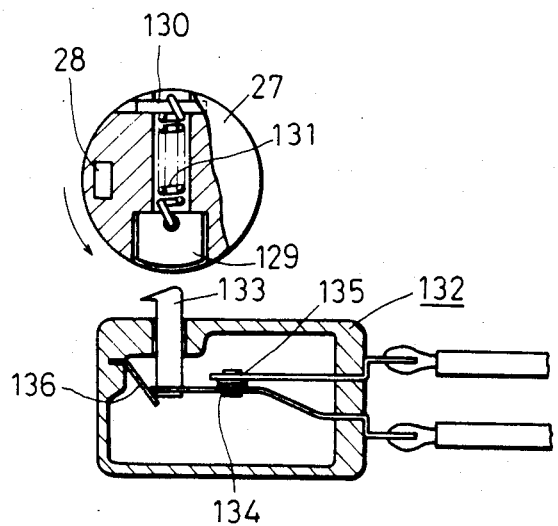
FIGS. 10(a) and 10(b) are detail views of the first safety switch of the tool in FIG. 9.
Figure 10B:
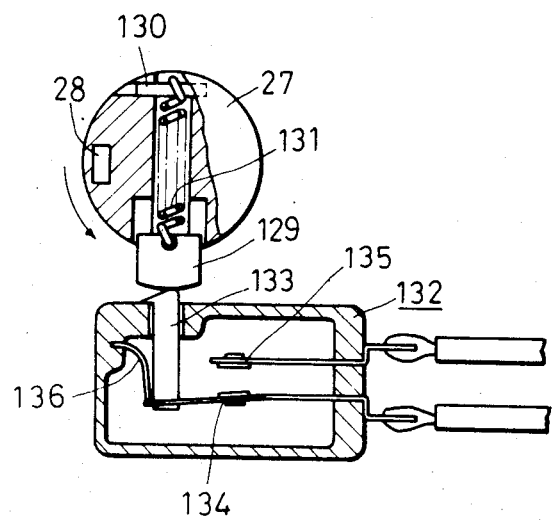
Figure 11A:
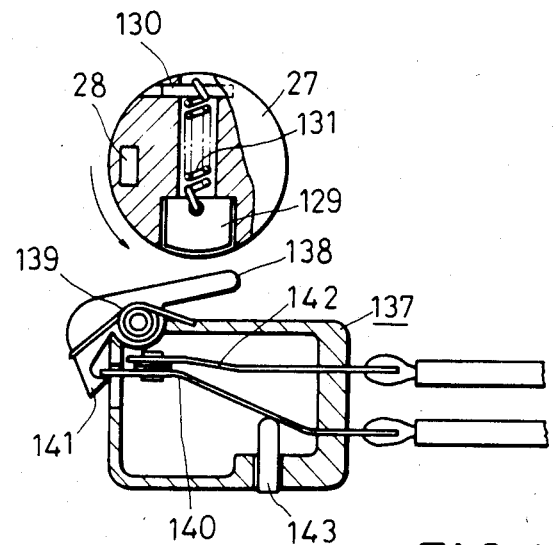
FIGS. 11(a) and 11(b) are detail views of the second safety switch of the tool in FIG. 9.
Figure 11B:
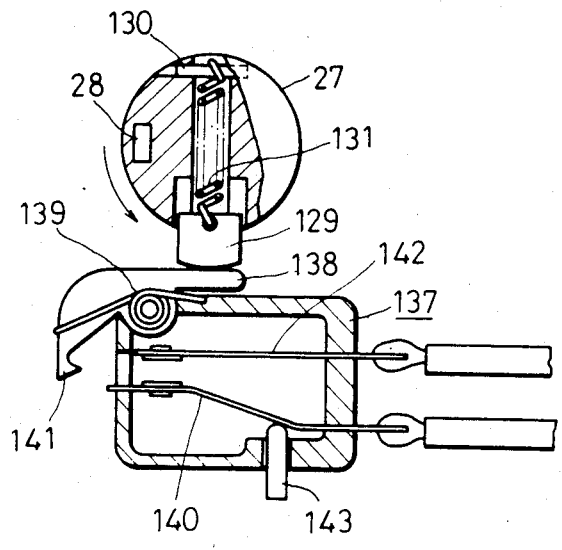

Referring to FIGS. 9 through 11, which show an alternate embodiment of the invention, a plastic-molded rotary ring 27 is mounted through a serration 26 to one end of an amarture shaft 25 of the motor M1. A magnet 28 for detecting the number of revolutions of the motor M1 is embedded in the rotary ring 27 and in opposed relationship with a magnetism-sensitive element Q1 embedded in the control circuit block 19. A push plate 129 is provided for reciprocating movement in the radial direction of the rotary ring 27 and to be biased in the axial direction of the rotary ring 27 through a pin 130 and a spring 131. When the number of revolutions of the motor M1 is unusually increased, for example, to 7,000 rpm and more, a centrifugal force exceeding the biasing force of the spring 131 is applied to the push plate 129, which in turn moves from a stop position in the rotary ring 27 as shown in FIGS. 10(a) and 11(a) to an outer position in the rotary ring 27 as shown in FIGS. 10(b) and 11(b). In this state, the push plate 129 pushes an actuator rod 133 of the safety switch 132 mounted in the control circuit block 19 as shown in FIG. 10, for example, to remove the movable contact 134 from the fixed contact 135 and locks the safety switch 132 through the set spring 136 under this off condition. Alternatively, by rotating the actuator lever 138 of the safety switch 137 as shown in FIG. 11 against the biasing force in the counter-clockwise direction, the movable contact 120 is engaged or disengaged with the pawl member 141 of the lever 138, so that the movable contact 140 may be removed from the fixed contact 142 by the resilient force and the safety switch 137 is retained under this off condition.

In the safety switch 137 illustrated in FIG. 11, there is provided a reset device which serves to turn on the safety switch 137 by pushing the movable contact 140 through a reset device or button 143 against the resilient force and by contacting it with the fixed contact. The reset device also serves to engage the movable contact 140 under the on state with a pawl member 141 of the lever 138 by the counter-clockwise rotation of the actuator lever 138 through the spring 139 and retain the safety switch 137 under the on state or restore it to the on state.

In operation, when the motor M1 is at a stop position or rotates at a normal revolution, for example, 6,000 rpm and below, a centrifugal force above the biasing force of the spring 131 is not applied to the push plate 129. As a result, under the condition, the push plate 129 is retained within the rotary ring 27 as shown in FIGS. 10(a) and 11(a), ensuring the on state of the safety switch 132 or 137 as shown in FIGS. 10(a) and 11(a).

When the design voltage of the motor M1 is set to about 75 V with respect to 100 V of the supply voltage, the operational capacity of the electrically-powered tool becomes high because of the increase in overload current and the triac TRI1 turns on at a full phase angle beyond any trigger control in a case of the failure of the switching element such as a triac TRI1. Especially, under the on condition at a full phase angle, when the motor M1 rotates with no load, the number of revolutions of the motor M1 remarkably exceeds the aforementioned specific revolutions, and as a result, because of the increase of the centrifugal force caused by the increased number of revolutions, the push plate 129 in the rotary ring 27 fixed to the armature shaft 25 projects outwardly from the rotary ring 27 against the biasing force of the spring 131 as shown in FIGS. 10(b) and 11(b), causing the actuator rod 133 of the safety switch 137 or the actuator lever 138 of the safety switch 137 to be pushed and the contacts 134, 135 or 140, 142 to be retained at the off state, so that the power is not supplied to the motor M1. Accordingly, a violent rotation of the motor M1 and the abrasive wheel can be prevented and the rotation of inertia of the motor M1 and the abrasive wheel 17 progressively stops without incurring the reaction owing to a sudden braking, ensuring the operator's safety at the occurrence of unusual rotation. After actuation of the safety switch 132 or 137, by replacing the safety switch 132 or pushing the reset button 143 of the safety switch 137, the disc grinder 20 can be brought to its original condition.

The transistors Tr1, Tr2 and Tr3 in the present embodiment may be substituted by an operational amplifier. The safety switch 132, 137 is of a resetless or reset type, but a toggle mechanism may be used to invert the movable contacts 134 and 140. In an alternate embodiment, a slight contact of the copper ring 40 with the brake shoe 31 as described in the first embodiment permits burn-out of a metal fuse by heat or a turn off of the main switch SW1 through a thermal sensor permits a forcible cutoff of the supply of power to the motor M1.

Although preferred embodiments of the invention has been disclosed and described, it is apparent that other embodiments and modifications of the invention are possible within the scope of the appended claims.

What is claimed is:

1. An electrically-powered tool of the type powered from an alternating current source, comprising:
    an electric motor (M1) for driving said tool;
    a motor housing (15) mounted within said tool for enclosing said electric motor (M1);
    a main switch (SW1) mounted within said electrical motor (M1) and electrically connected in series with said alternating current source and said electric motor (M1);
    a switching element (TRI1) also connected in series with said electric motor (M1) for controlling the phase of current flow to said electric motor (M1);
    a revolution directing circuit (33) for generating pulses proportional to the speed of said electric motor (M1);
    a monostable multivibrator (Q3) for generating a fixed length of pulse responsive to the pulse outputs from said revolution detecting circuit (33);
    a smoothing circuit (34) for feeding the pulse outputs from said monostable multivibrator (Q3) to a capacitor (C3) and for generating a d.c. voltage proportional to the varying pulse frequency in proportion to the speed of said electric motor (M1);
    a first transistor (Tr1) for varying on resistance thereof in inverse proportion to the magnitude of the d.c. output voltage fed from said smoothing circuit (34);
    a second transistor (Tr2) for substantially varying on resistance thereof when the magnitude of the d.c. output voltage fed from said smoothing circuit (34) fails below the d.c. output voltage of said electric motor (M1) in an overload condition;
    a first and second series circuits in parallel:
    said first series circuit including said first transistor (Tr1) and a resistor (R9),
    said second series circuit including said second transistor (Tr2) and a resistor (R10);
    a capacitor (C5) in parallel with said series circuits and charging only when said main switch (SW1) is turned on, and
    a bias resistor (R8) in parallel with said capacitor (C5);
    a third transistor (Tr3) for varying on resistance thereof through the base voltage dependent on the voltage dividing portion of said parallel circuit and a resistor (R14);
    a capacitor (C4) charged through said third transistor (Tr3) during each half cycle of the a.c. voltage fed from said alternating current source;
    a programmable unijunction transistor (PUT1) adapted to conduct when the charged voltage of said capacitor (C4) becomes higher than the gate voltage set by resistors (R16 and R17), thereby developing a discharge voltage from said capacitor (C4); and
    a trigger circuit (36) for receiving the output voltage from said programmable unijunction transistor (PUT1) and for generating a trigger signal to the gate terminal of said switching element (TRI1).

2. An electrically-powered tool as defined in claim 1 further comprising:
    a rotary ring (27) mechanically connected to an armature (A1) of said electric motor (M1) for rotation therewith;
    a push plate (129) connected to said rotary ring (27) and having a spring (131) for inwardly biasing said push plate (129) in the radial direction of said rotary ring (27), said push plate (129) being movable outwardly from said rotary ring (27);
    a safety switch (132) mounted to said motor housing and having a movable contact (134) and a fixed contact (135), said safety switch (132) being connected in series with said main switch (SW1), said electric motor (M1) and said switching element (TRI1);
    an actuator rod (133) movably connected to said safety switch (132) and disposed opposite to said push plate (129) such that when said push plate (129), during runaway rotation of said electric motor (M1), is moved outwardly from said rotary ring (27) in opposition to the biasing force of said spring (131), said actuator rod (133) is pushed to thereby separate said movable contact (134) from said fixed contact (135); and
    means mounted to said safety switch (132) for holding said movable contact (134) and fixed contact (135) at their off state to thereby cut off the current flow to said electric motor (M1).

* * * * *